United States Patent [19]

Kanazawa

[11] Patent Number: 5,124,679
[45] Date of Patent: Jun. 23, 1992

[54] AUTOMATIC POWER BREAKER AND RELAY AND WATER SENSOR USED IN THE AUTOMATIC POWER BREAKER

[75] Inventor: Nobuyoshi Kanazawa, Kashiwa, Japan

[73] Assignee: Uchiya Thermostat Co., Saitama, Japan

[21] Appl. No.: 551,210

[22] Filed: Jul. 11, 1990

[30] Foreign Application Priority Data

Jul. 11, 1989 [JP] Japan .................................. 1-178339

[51] Int. Cl.⁵ .......................................... H01H 73/00
[52] U.S. Cl. ...................................... 335/18; 335/190; 335/185
[58] Field of Search .................................. 335/78–86, 335/124, 126, 128, 131, 202, 182, 183, 186, 185, 190, 256, 266, 179; 361/42, 43, 44, 45, 46, 47, 48, 49, 50, 51

[56] References Cited

U.S. PATENT DOCUMENTS 4,706,153 11/1987 Sainomoto et al. ................... 361/42
5,013,891 5/1991 Shoemaker .......................... 361/42

FOREIGN PATENT DOCUMENTS 242664 11/1924 United Kingdom .

*Primary Examiner*—Leo P. Picard
*Assistant Examiner*—Lincoln Donovan
*Attorney, Agent, or Firm*—Levy, Zito & Grandinetti

[57] ABSTRACT

A relay includes a movable element having first and second portions separated from each other. The first portion can be moved between a first stable position corresponding to a state where contacts are closed and a second stable position corresponding to a state where the contacts are opened while abutting against resilient plates. The second portion can push the first portion so that the first portion is moved from the second stable position to the first stable position by application of external force. The second portion is always urged to go away from the first portion by a spring. The first and second portions are disposed to be separated from each other by a distance corresponding to a stroke of the first portion when the first portion is positioned at the first stable position. The first portion of the movable element is moved from the first stable position to the second stable position by a magnetic force of a solenoid coil when sensor terminals are electrically connected to each other.

2 Claims, 4 Drawing Sheets

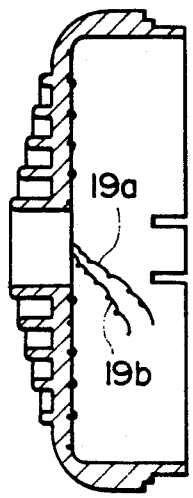
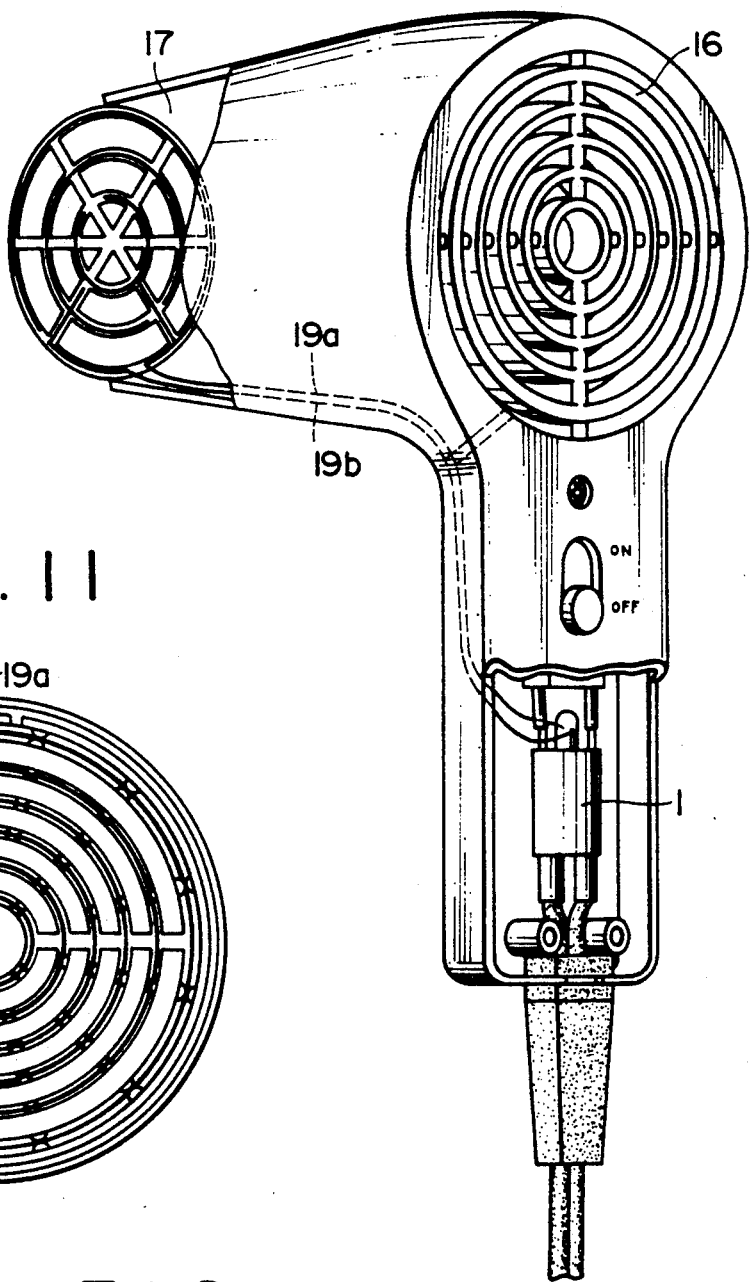
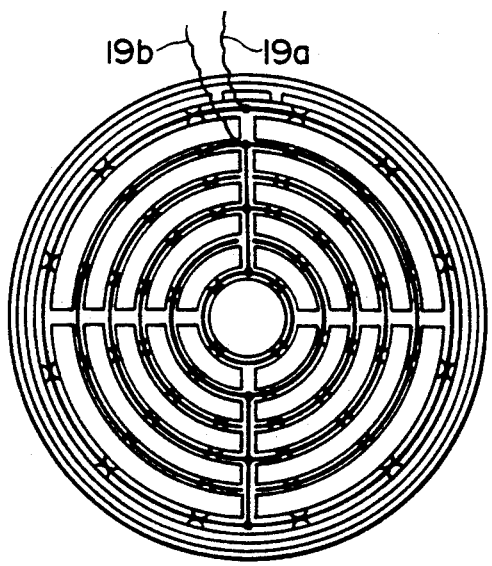
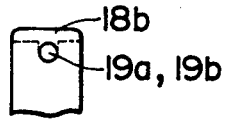

AUTOMATIC POWER BREAKER AND RELAY AND WATER SENSOR USED IN THE AUTOMATIC POWER BREAKER

FIELD OF THE INVENTION AND RELATED ART STATEMENT

The present invention relates to an automatic power breaker when submerged. More particularly, the present invention relates to an automatic power breaker which can be incorporated into a hair dryer or the like as a safety device to cut off a power supply immediately when the hair dryer or the like is dropped into a bathtub or the like.

An electric appliance such as a hair dryer is often used in the environment where the humidity is large and accordingly electrical elements used in the electric appliance utilize water-proof elements.

Further, the power supply circuit generally utilizes a protection circuit which cuts off the power supply when an output current exceeds a predetermined value in order to protect the circuit.

Since the hair dryer uses electricity, it was commonsense to avoid water, although it is reported that the hair dryer is used in the bathroom recently. In this case, if the hair dryer being supplied with the electricity is dropped in the water, the user is struck by the electricity even if the water-proof elements and the power protection circuit are provided in the hair dryer and it is very dangerous.

Japanese Patent Application No. 63-281097 discloses an automatic power breaker for use in this type of electric appliances.

FIG. 16 is a circuit diagram showing an example of a conventional automatic power breaker. A relay R is connected between the power supply and a load, and contacts of the relay R are always on. The relay R includes first and second solenoids S1 and S2 and a water sensor WS is connected in series between the first and second solenoids. The water sensor WS includes two electrodes Pa and Pb and a water containable insulator H. the water sensor is disposed in the vicinity of an opening M formed in an outer wall W of the electric appliance. When the electric appliance is dropped in the water, both of the electrodes are short-circuited through water entered through the opening M to electrically connect both the solenoids of the relay so that a single solenoid connected in series is formed. Both ends of the single solenoid are connected to the power lines and accordingly the solenoid is energized. Consequently, connection between an output of the power supply and an input terminal of the load is cut off.

Since the water containable insulator is disposed between both the electrodes of the water sensor, the insulator contains water to keep the power supply to be cut off even when the electric appliance is pulled up from the water. When the water containable insulator is dried, both the electrodes are insulated form each other to prevent the solenoid from being supplied with the electricity so that the cut-off of the power supply is released. That is, the load is electrically connected to the power supply.

The relay used in the conventional automatic power breaker cuts off the power supply immediately when the coil thereof is energized while the power supply is connected to the load immediately when the energization of the coil thereof is stopped. Further, since the sensor element is directly connected to the input power supply through the coils, the sensor element is an energized portion, that is, is energized, even when the load is cut off from the power supply. Accordingly, when the electric appliance is wet even when the electric appliance has been pulled up from the water, it is necessary to maintain the power supply to be cut off. Thus, the water sensor for the automatic power breaker of this type requires water containing means such as cotton.

Further, since the water sensor used in the conventional automatic power breaker has a large occupancy volume, it is difficult to detect water or submergence at many points.

OBJECT AND SUMMARY OF THE INVENTION

It is an first object of the present invention to provide a relay which changes from an energization state to a cut-off state when a coil thereof is energized and maintains the cut-off state even when the energization to the coil is stopped and which can release the cut-off state only by forcedly moving an movable element by an external force.

It is a second object of the present invention to provide an automatic power breaker which cuts off a power supply immediately when a water sensor is submerged so that a load circuit is cut off by operation of a coil and at the same time a sensor portion becomes an unenergized portion and which can maintain the water sensor to be cut off when pulled up from water and can release the cut-off state of the water sensor at any time.

It is a third object of the present invention to provide a water sensor capable of sensing water at many points.

The first object is achieved by a relay including first and second input terminals, first and second output terminals, first and second sensor terminals, a first coil having an end connected to the first sensor terminal, a second coil having an end connected to the second sensor terminal, a first contact for electrically connecting the first input terminal with the first output terminal, a second contact for electrically connecting the second input terminal with the second output terminal, first and second resilient plates for opening and closing both the contacts, respectively, and a movable element which, when a current flows through both the coils, changes a position where the element abuts against both the resilient plates so that the element is moved to open both the contacts, whereby the current flows through both the coil when both the sensor terminals are electrically connected to each other, characterized in that the movable element comprises first and second portions separated from each other and the first portion can be moved between a first stable position corresponding to a state where both the contacts are closed and a second stable position corresponding to a state where both the contacts are opened while abutting against both the resilient plates, the second portion capable of pushing the first portion so that the first portion is moved from the second stable position to the first stable position by application of external force, the second portion being always urged to go away from the first portion by a spring, the first and second portions being disposed to be separated from each other by a distance corresponding to a stroke of the first portion when the first portion is positioned at the first stable position, the first portion of the movable element being moved from the first stable position to the second stable position by a magnetic force of the coil when the sensor terminals are electrically connected to each other.

The second object is achieved by an automatic power breaker which is configured so that a power supply is connected to the first and second input terminals of the relay solving the first object and a load is connected to the first and second output terminals, the other ends of the first and second coils being connected to the first and second output terminals, respectively, a water sensor which is conductive when submerged being connected to the first and second sensor terminals.

The third object is achieved by a water sensor including a lattice formed of an insulator and two conductors which are insulated from each other and are disposed on the lattice so that a plurality of water sensing points each formed of a portion in which both the conductors approach each other within a distance of 5 millimeters or less are formed, both the conductors being electrically connected to each other to detect water or submergence when the water sensing points are submerged.

Description is made to the automatic power breaker achieving the second object formed by connecting the water sensor achieving the third object to both the sensor terminals of the relay achieving the first object.

When the electrical appliance provided with the automatic power breaker is dropped in the water, the water sensor is also submerged. Since the water sensor achieving the third object includes the conductors having a multiplicity of points in which both the conductors approach each other, when at least one of the points is submerged, both the conductors are electrically connected to each other through water even if the whole electrical appliance is not submerged.

Consequently, a current flows through both the coils of the relay and the first movable element is moved from the first stable position to the second stable position. That is, contacts of the relay are opened and an input side and an output side of the relay are cut off. When the electrical appliance is pulled up from the water and both the conductors of the water sensor are non-conductive, the excitation force of the coil is lost. The first movable element is not pressed by the spring and the direction of the pressing force to the second movable element by the spring is the direction of moving the second movable element away from the first movable element. Accordingly, the first movable element is different from an ordinary relay and is not returned to the first stable position even if the excitation force of the coil is lost. That is, when the electrical appliance is pulled up from the water and is still wet, there is no possibility that the user is not stuck by the electricity even if the user comes into contact with the electrical appliance. After the electrical appliance has been dried sufficiently, an external force is applied to the second movable element of the relay to move the second movable element toward the first movable element against the pressing force of the spring so that the first movable element is pushed back. Consequently, the first movable element is moved back from the second stable position to the first stable position. Namely, the power supply connected to the input terminal of the relay is connected to the load connected to the output terminal of the relay.

BRIEF DESCRIPTION OF THE DRAWINGS

FIG. 9 is a partially broken perspective view of a dryer incorporating the relay of the first invention, a water sensor of the third invention and the automatic power breaker of the second invention;

FIG. 10 is a sectional view of the water sensor;

FIG. 11 is a front view of the water sensor as viewed from the inner side of the electrical appliance;

FIGS. 12 and 13 are enlarged sectional views of a groove of the water sensor;

DETAILED DESCRIPTION OF PREFERRED EMBODIMENTS

Figure 1:
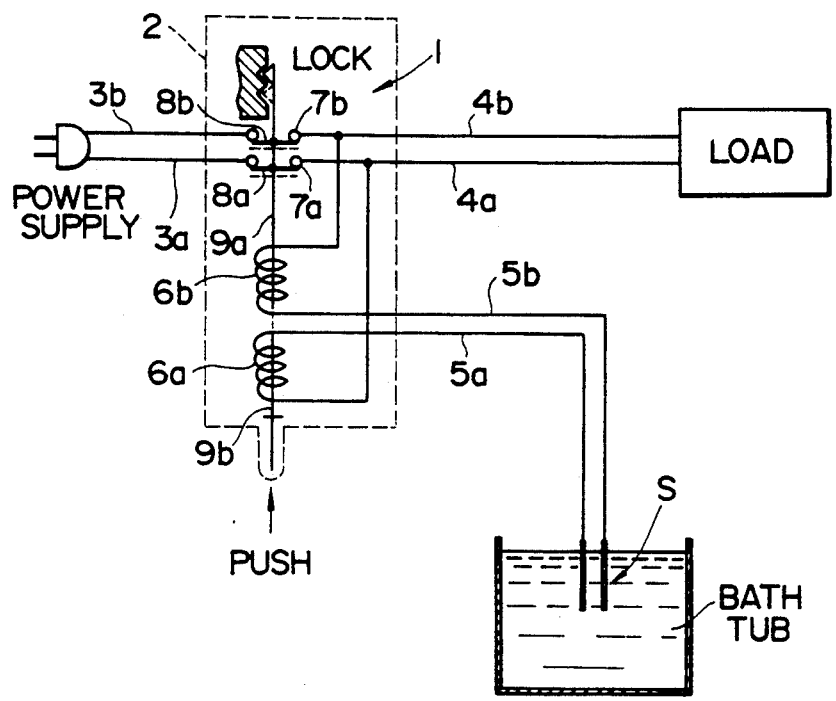
FIG. 1 is a schematic diagram of an embodiment of an automatic power breaker using a relay according a first invention.

A relay 1 is covered by a water-proof cover 2. The relay 1 comprises first and second input terminals 3a and 3b, first and second output terminals 4a and 4b, first and second sensor terminals 5a and 5b, first and second coils 6a and 6b, first and second contacts 7a and 7b, first and second resilient plates 8a and 8b, and first and second portions 9a and 9b of a movable element. The first and second input terminals 3a and 3b are connected to a power supply and the first and second output terminals 4a and 4b are connected to a load including, for example, a heater and a fan of a hair dryer. The sensor terminals are connected to a water sensor S.

Figure 2:
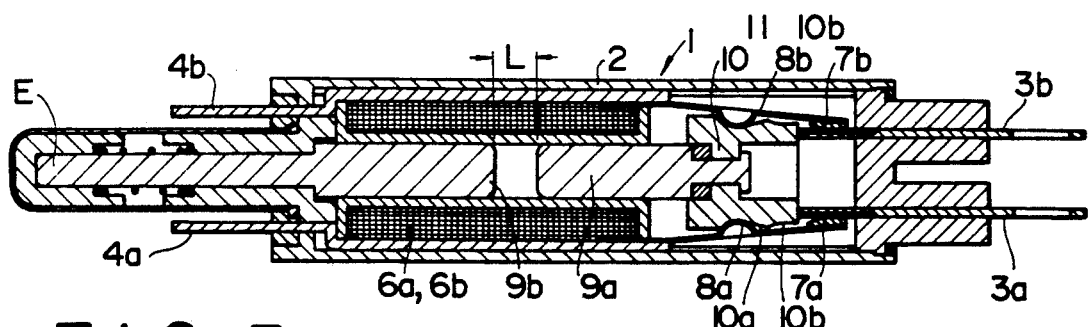
FIG. 2 is a sectional view showing a position of a first portion of a movable element when contacts of a relay according to the first invention are closed.
Figure 3:
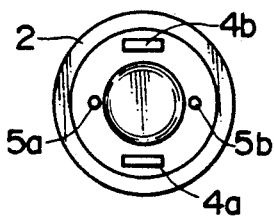
FIG. 3 is a left side view of a relay of FIG. 2.
Figure 4:
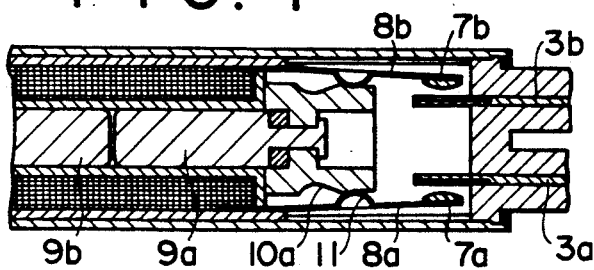
FIG. 4 is a sectional view partially omitted showing a position of a fist portion of a movable element when the contacts of the relay of FIG. 2 are opened.
Figure 5:
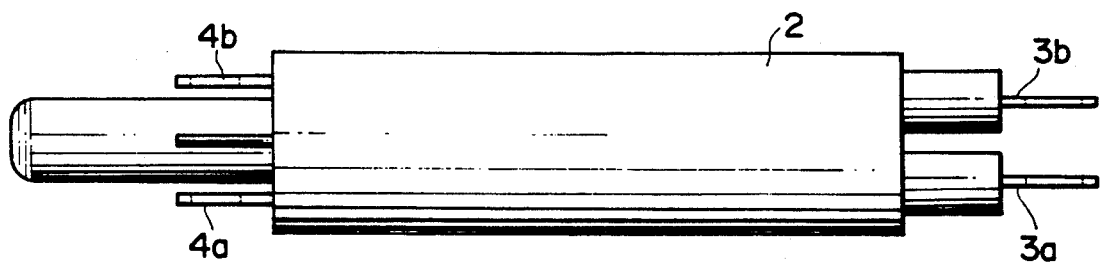
FIG. 5 is a front view of the relay of FIG. 2.
Figure 6:
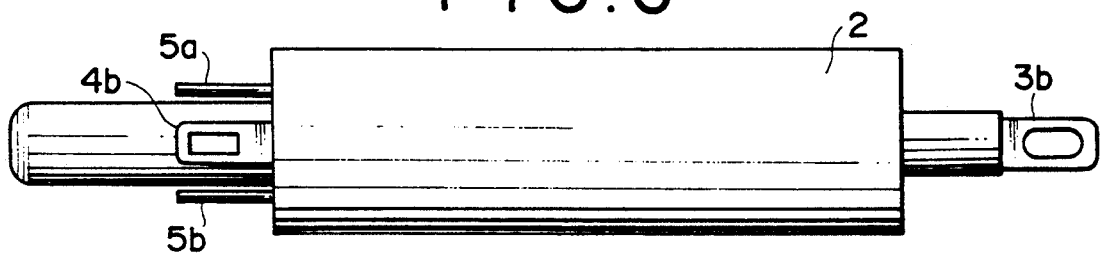
FIG. 6 is a plan view of the relay of FIG. 2.
Figure 7:
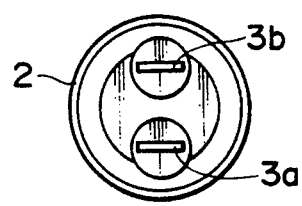
FIG. 7 is a right side view of the relay of FIG. 2.

The movable element includes the first and second portions 9a and 9b and the first portion 9a includes an abutment 10 which abut against the resilient plates 8a and 8b. The abutment 10 is formed with recesses 10a and 10b corresponding to a projection 11 formed in the resilient plates 8a and 8b. When the projection 11 is engaged in the first recess 10a, the contacts 7a and 7b are closed as shown in FIG. 2. When both sensor terminals 5a and 5b are electrically connected to each other, both the coils 6a and 6b shown integrally in FIGS. 2 and 4 are connected in series to each other and the first portion 9a of the movable element is moved by a magnetic force of a current flowing through both the coils so that the second recess 10b is engaged with the projection 11 as shown in FIG. 4. At this time, both the contacts 7a and 7b are opened and the input terminals 3a and 3b of the relay are electrically cut off from the output terminals 4a and 4b of the relay.

When the contacts are closed, the first portion 9a of the movable element is separated from the second portion 9b by a distance L as shown in FIG. 2. This distance L corresponds to a stroke for moving the first portion from a first stable position in which the first recess 10a is engaged with the projection 11 to a second stable position in which the second recess 10b is engaged with the projection 11.

The second portion 9b of the movable element is always urged to be separated from the first portion 9b by a spring 12. Accordingly, when the electrical connection between both the sensor contacts is cut off, the restoring force is not effected to both the portions of the movable element unlike an ordinary relay. Consequently, when the first portion is positioned at the second stable position as shown in FIG. 4, the first recess 10b is maintained in the engaged state with the projection 11. When an end E of the second portion 9b of the movable element is pushed externally of the relay, the first portion 9a is also pushed and the state is returned from the state of FIG. 4 to the state of FIG. 2.

Figure 8:
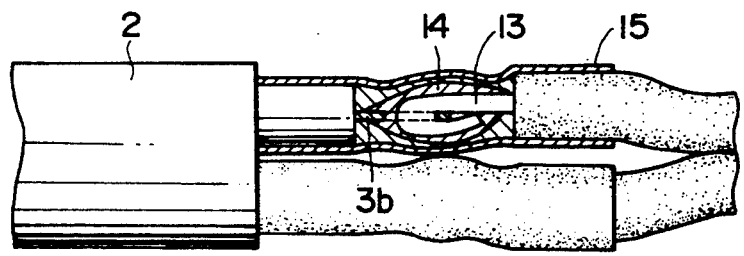
FIG. 8 is a sectional view of a connection of a power input terminal and a power supply cord of the relay.

In order to prevent the user from being struck by the electricity from both the input terminals and both the output terminals when the electrical appliance is dropped in the water, it is necessary to waterproof these terminal portions. Accordingly, as shown in FIG. 8, the terminal portions are waterproofed after the terminals are joined with lead wires 13 by solder 14.

A water sensor as shown in FIGS. 10 and 11 are disposed in an air inlet 16 and an air outlet 17 of a dryer shown in FIG. 9. The water sensor includes two conductors 19a and 19b disposed in a groove 18a formed in a lattice 18 made of an insulator so that the two conductors 19a and 19b do not come into electric contact with each other and the two conductors 19a and 19b approach each other within 5 mm or less at many points and which are covered by the insulator 18b thermally molten as shown in FIG. 13 to fix the conductors 19a and 19b in the groove. Both the conductors are connected to the sensor terminals of the relay 1. Since the conductors 19a and 19b of the water sensor are disposed at the inner side of the electrical appliance, there is no problem that an electric shock is received and the beauty of the electrical appliance is injured. Further, when the electrical appliance is dropped in the water, water enters into the electrical appliance through the air inlet 16 or the air outlet 17 and accordingly the power is cut off immediately.

Figure 14:
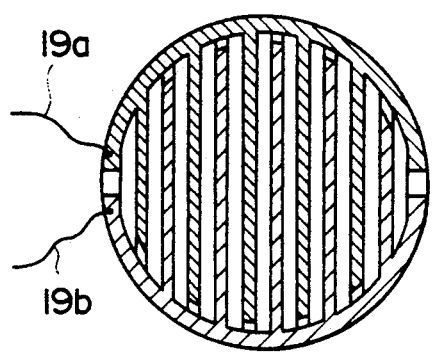
FIGS. 14 and 15 are front views of another embodiment of a water sensor.
Figure 15:
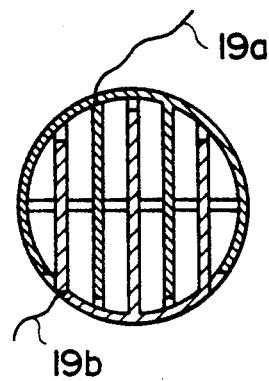
Figure 16:
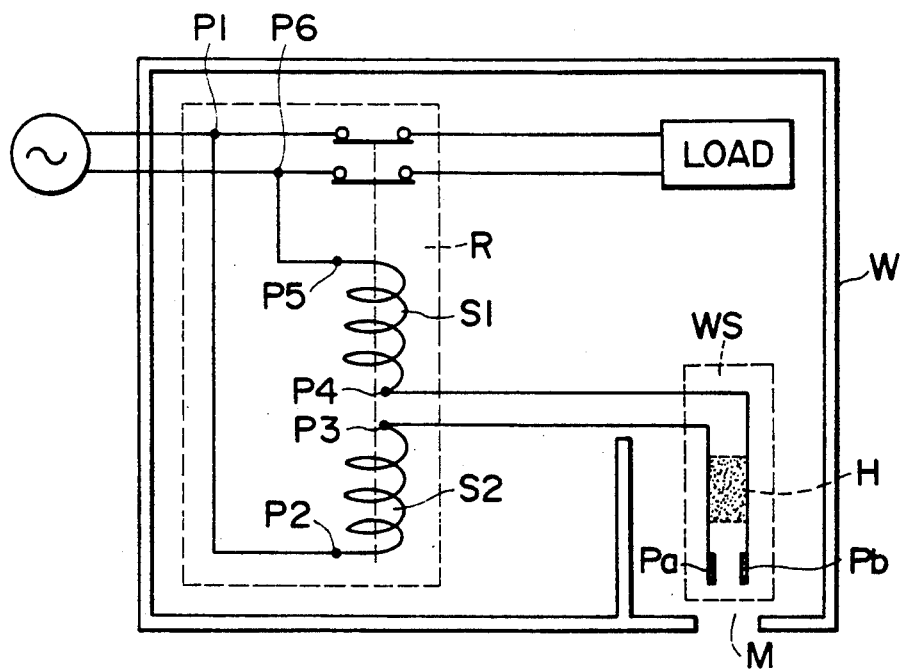
FIG. 16 is a circuit diagram showing an example of a conventional automatic power breaker.

The water sensor can be formed by disposing two conductors on a printed wiring board in the form of lattice as shown in FIGS. 14 and 15, for example.

Effects of the present invention are as follows.

According to the first invention, the open state of the contacts can be maintained mechanically and can be released at any time.

According to the second invention, since the whole circuit becomes the unenergized portion when the coil is operated, there is no possibility that the electric shock is received even if the user comes into contact with the electrical appliance immediately after the electrical appliance dropped in the water has been pulled up from the water.

According to the third invention, many sensing points can be provided and accordingly the submergence can be detected immediately even if the electrical appliance is dropped in any condition.

I claim:

1. A relay including first and second input terminals, first and second output terminals, first and second sensor terminals, a first coil having an end connected to the first sensor terminal, a second coil having an end connected to the second sensor terminal, a first contact for electrically connecting the first input terminal with the first output terminal, a second contact for electrically connecting the second input terminal with the second output terminal, first and second resilient plates for opening and closing both the contacts, respectively, and a movable element which, when a current flows through both the coils, changes a position where the element abuts against both the resilient plates so that the element is moved to open both the contacts, whereby the current flows through both the coils when the sensor terminals are electrically connected to each other, characterized in that the movable element comprises first and second portions separated from each other and the first portion can be moved between a first stable position corresponding to a state where both the contacts are closed and a second stable position corresponding to a state where both the contacts are opened while abutting against both the resilient plates, the second portion capable of pushing the first portion so that the first portion is moved from the second stable position to the first stable position by application of external force, the second portion being always urged to go away from the first portion by a spring, the first and second portions being disposed to be separated from each other by a distance corresponding to a stroke of the first portion when the first portion is positioned at the first stable position, the first portion of the movable element being moved from the first stable position to the second stable position by a magnetic force of the coil when the sensor terminals are electrically connected to each other.

2. A relay according to claim 1, wherein said first and second input terminals of the relay are connected to a power supply, said first and second output terminals being connected with a load, said first and second sensor terminals being connected with a water sensor that is conductive when it is submerged in water, said relay functioning as an automatic power breaker in case of being submerged in water.

* * * * *